United States Patent
Nagasaka et al.

(10) Patent No.: US 10,820,239 B2
(45) Date of Patent: Oct. 27, 2020

(54) COMMUNICATION METHOD, PROCESSOR, BASE STATION, AND NETWORK APPARATUS

(71) Applicant: KYOCERA CORPORATION, Kyoto (JP)

(72) Inventors: Yushi Nagasaka, Ritto (JP); Katsuhiro Mitsui, Ritto (JP); David Comstock, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 109 days.

(21) Appl. No.: 16/145,636

(22) Filed: Sep. 28, 2018

(65) Prior Publication Data

US 2019/0045402 A1 Feb. 7, 2019

Related U.S. Application Data (63) Continuation of application No. PCT/JP2017/011956, filed on Mar. 24, 2017.

(Continued)

(51) Int. Cl.
*H04W 36/00* (2009.01)
*H04W 92/20* (2009.01)
*H04W 36/28* (2009.01)
*H04W 76/11* (2018.01)
*H04W 24/10* (2009.01)

(Continued)

(52) U.S. Cl.
CPC ....... *H04W 36/0009* (2018.08); *H04W 24/10* (2013.01); *H04W 36/0069* (2018.08); *H04W 36/08* (2013.01); *H04W 36/28* (2013.01); *H04W 36/38* (2013.01); *H04W 76/11* (2018.02); *H04W 92/20* (2013.01); *H04W 80/02* (2013.01); *H04W 80/08* (2013.01); *H04W 84/12* (2013.01); *H04W 88/06* (2013.01)

(58) Field of Classification Search
CPC ......... H04W 36/0009; H04W 36/0069; H04W 36/28; H04W 92/20; H04W 36/38; H04W 36/08; H04W 88/06
See application file for complete search history.

(56) References Cited

U.S. PATENT DOCUMENTS

| 10,452,861 B2 * | 10/2019 | Rajadurai | H04W 12/02 |
| 2016/0157156 A1 * | 6/2016 | Chen | H04W 36/28 370/331 |

(Continued)

OTHER PUBLICATIONS

NEC, "LTE mobility in LWA", 3GPP TSG RAN WG2 Meeting #92, R2-156617, Nov. 16-20, 2015, 3 pages, Anaheim, USA.

(Continued)

*Primary Examiner* — Min Jung
(74) *Attorney, Agent, or Firm* — Studebaker & Brackett PC (57) ABSTRACT

In a communication method according to one embodiment, a first base station sets a WLAN (Wireless Local Area Network) mobility set that is a set of one or more WLAN identifiers to a user equipment. The first base station decides a handover of the user equipment to a second base station. The first base station includes, in a handover request message for the user equipment, an identifier of a WLAN termination device associated with the one or more WLAN identifiers. The first base station transmits the handover request message including the identifier of the WLAN termination device to the second base station.

10 Claims, 6 Drawing Sheets

Related U.S. Application Data (60) Provisional application No. 62/316,752, filed on Apr. 1, 2016.

(51) Int. Cl.
| | | |
|---|---|---|
| *H04W 36/08* | (2009.01) | |
| *H04W 36/38* | (2009.01) | |
| *H04W 84/12* | (2009.01) | |
| *H04W 88/06* | (2009.01) | |
| *H04W 80/02* | (2009.01) | |
| *H04W 80/08* | (2009.01) | |

(56) References Cited

U.S. PATENT DOCUMENTS

| | | | |
|---|---|---|---|
| 2017/0164221 A1* | 6/2017 | Tan Bergstrom | H04W 24/04 |
| 2017/0289855 A1* | 10/2017 | Xu | H04W 36/08 |
| 2017/0289873 A1* | 10/2017 | Kim | H04W 36/28 |
| 2017/0318458 A1* | 11/2017 | Laselva | H04W 12/0401 |
| 2018/0132143 A1* | 5/2018 | Sirotkin | H04W 88/06 |
| 2018/0192331 A1* | 7/2018 | Masini | H04W 36/0027 |
| 2018/0288815 A1* | 10/2018 | Byun | H04W 92/20 |
| 2018/0338268 A1* | 11/2018 | Lee | H04W 28/08 |
| 2019/0037433 A1* | 1/2019 | Nagasaka | H04W 28/0252 |
| 2019/0116527 A1* | 4/2019 | Ke | H04W 36/0027 |

OTHER PUBLICATIONS

Media Tek Inc., "LTE/WLAN aggregation mobility aspects", 3GPP TSG-RAN2 #91 Meeting, R2-153814, Aug. 24-28, 2015, 6 pages, Beijing, China.

3rd Generation Partnership Project; "Technical Specification Group Radio Access Network; Evolved Universal Terrestrial Radio Access (E-UTRA) and Evolved Universal Terrestrial Radio Access Network (E-UTRAN)"; 3GPP TS 36.300 V13.2.0; Dec. 2015; pp. 1-290; Release 13; 3GPP Organizational Partners.

CATT; "Discussion on Inter-eNB Handover Procedure for Rel-14 LWA"; 3GPP TSG RAN WG2 Meeting #93bis; R2-162187; Apr. 11-15, 2016; pp. 1-3; Dubrovnik, Croatia.

\* cited by examiner

COMMUNICATION METHOD, PROCESSOR, BASE STATION, AND NETWORK APPARATUS

CROSS-REFERENCE TO RELATED APPLICATION

The present application is a continuation based on PCT Application No. PCT/JP2017/011956 filed on Mar. 24, 2017, which claims the benefit of U.S. Provisional Application No. 62/316,752 (filed on Apr. 1, 2016). The content of which are incorporated by reference herein in their entirety.

FIELD

The present application relates to a communication method, a processor, a base station, and a network apparatus.

BACKGROUND

In LTE (Long Term Evolution) of which the specifications are designed in 3GPP (3rd Generation Partnership Project), which is a project aiming to standardize a cellular communication technology, LWA (LTE-WLAN Aggregation) is introduced (see Non Patent Document 1).

LWA allows user equipments to use not only radio resources of LTE (cellular communication system) but also radio resources of WLAN (Wireless LAN (Local Area Network): WLAN communication system). In LWA, data (packet) is transmitted from a base station to a user equipment via a WLAN termination device (WT: WLAN Termination).

SUMMARY

In a communication method according to one embodiment, a first base station sets a WLAN (Wireless Local Area Network) mobility set that is a set of one or more WLAN identifiers to a user equipment. The first base station decides a handover of the user equipment to a second base station. The first base station includes, in a handover request message for the user equipment, an identifier of a WLAN termination device associated with the one or more WLAN identifiers. The first base station transmits the handover request message including the identifier of the WLAN termination device to the second base station.

A processor according to one embodiment is a processor for controlling a base station (first base station). The processor executes the processes of: setting a WLAN (Wireless Local Area Network) mobility set that is a set of one or more WLAN identifiers to a user equipment; deciding a handover of the user equipment to a second base station; including, in a handover request message for the user equipment, an identifier of a WLAN termination device associated with the one or more WLAN identifiers; and transmitting the handover request message including the identifier of the WLAN termination device to the second base station.

A base station (first base station) according to one embodiment includes a controller. The controller is configured to set a WLAN (Wireless Local Area Network) mobility set that is a set of one or more WLAN identifiers to a user equipment, decide a handover of the user equipment to a second base station, include, in a handover request message for the user equipment, an identifier of a WLAN termination device associated with the one or more WLAN identifiers, and transmit the handover request message including the identifier of the WLAN termination device to the second base station.

A processor according to one embodiment is a processor for controlling a base station (second base station). The processor executes a process of receiving, from a first base station, a handover request message for a user equipment to which a WLAN (Wireless Local Area Network) mobility set that is a set of one or more WLAN identifiers is set, the handover request message including an identifier of a WLAN termination device associated with the one or more WLAN identifiers.

A base station (second base station) according to one embodiment includes a controller. The controller is configured to receive, from a first base station, a handover request message for a user equipment to which a WLAN (Wireless Local Area Network) mobility set that is a set of one or more WLAN identifiers is set. The handover request message includes an identifier of a WLAN termination device associated with the one or more WLAN identifiers.

A processor according to one embodiment is a processor for controlling a network apparatus. The processor executes a process of receiving, from a base station, a WLAN addition request message for requesting preparation of a resource for a user equipment. The WLAN addition request message includes an identifier of a user equipment assigned by the network apparatus.

A network apparatus (WLAN termination device) according to one embodiment includes a controller. The controller is configured to receive, from a base station, a WLAN addition request message for requesting preparation of a resource for a user equipment. The WLAN addition request message includes an identifier of a user equipment assigned by the network apparatus.

DESCRIPTION OF THE EMBODIMENT

Overview of Embodiment

In a communication method according to one embodiment, a first base station sets a WLAN (Wireless Local Area Network) mobility set that is a set of one or more WLAN identifiers to a user equipment. The first base station decides a handover of the user equipment to a second base station. The first base station includes, in a handover request message for the user equipment, an identifier of a WLAN termination device associated with the one or more WLAN identifiers. The first base station transmits the handover request message including the identifier of the WLAN termination device to the second base station.

The second base station may transmit a WLAN addition request message for requesting preparation of a resource for a user equipment to the WLAN termination device identified based on the identifier of the WLAN termination device.

The first base station may include, in the handover request message, an identifier of the user equipment assigned by the WLAN termination device. The first base station may transmit, to the second base station, the handover request message including the identifier of the user equipment.

The second base station may include, in the WLAN addition request message for requesting preparation of a resource for the user equipment, the identifier of the user equipment assigned by the WLAN termination device. The second base station may transmit, to the WLAN termination device, the WLAN addition request message including an identifier of the identifier of the user equipment.

The WLAN termination device may transmit, to the second base station, a WLAN addition request acknowledge message that is a response to the WLAN addition request message. The second base station may include, in a handover request acknowledge message that is a response to the handover request message, holding information indicating that the WLAN termination device holds a context of the user equipment. The second base station may transmit, to the first base station, the handover request acknowledge message including the holding information.

The first base station may include, in a WT release message for requesting release of a resource for the user equipment, holding information indicating that the WLAN termination device holds a context of the user equipment. The first base station may transmit, to the WLAN termination device, the WT release message including the holding information.

A processor according to one embodiment is a processor for controlling a base station (first base station). The processor executes the processes of; setting a WLAN (Wireless Local Area Network) mobility set that is a set of one or more WLAN identifiers to a user equipment; deciding a handover of the user equipment to a second base station; including, in a handover request message for the user equipment, an identifier of a WLAN termination device associated with the one or more WLAN identifiers; and transmitting the handover request message including the identifier of the WLAN termination device to the second base station.

A base station (first base station) according to one embodiment includes a controller. The controller is configured to set a WLAN (Wireless Local Area Network) mobility set that is a set of one or more WLAN identifiers to a user equipment, decide a handover of the user equipment to a second base station, include, in a handover request message for the user equipment, an identifier of a WLAN termination device associated with the one or more WLAN identifiers, and transmit the handover request message including the identifier of the WLAN termination device to the second base station.

A processor according to one embodiment is a processor for controlling a base station (second base station). The processor executes a process of receiving, from a first base station, a handover request message for a user equipment to which a WLAN (Wireless Local Area Network) mobility set that is a set of one or more WLAN identifiers is set, the handover request message including an identifier of a WLAN termination device associated with the one or more WLAN identifiers.

A base station (second base station) according to one embodiment includes a controller. The controller is configured to receive, from a first base station, a handover request message for a user equipment to which a WLAN (Wireless Local Area Network) mobility set that is a set of one or more WLAN identifiers is set. The handover request message includes an identifier of a WLAN termination device associated with the one or more WLAN identifiers.

A processor according to one embodiment is a processor for controlling a network apparatus. The processor executes a process of receiving, from a base station, a WLAN addition request message for requesting preparation of a resource for a user equipment. The WLAN addition request message includes an identifier of a user equipment assigned by the network apparatus.

A network apparatus (WLAN termination device) according to one embodiment includes a controller. The controller is configured to receive, from a base station, a WLAN addition request message for requesting preparation of a resource for a user equipment. The WLAN addition request message includes an identifier of a user equipment assigned by the network apparatus.

In the current specification, it is not assumed that in a state where a user equipment is set (configured) for LWA, the user equipment executes a handover. Therefore, there is a possibility that a new setting for LWA to the user equipment is performed each time a handover is executed.

A source base station according to one embodiment includes a controller configured to set a WLAN mobility set to a user equipment. The controller is configured to transmit, to a target base station, a handover request message depending on decision of the handover of the user equipment. The handover request message includes an identifier of a WLAN termination device associated with an identifier of a WLAN access point included in the WLAN mobility set.

The handover request message may include the WLAN mobility set.

The source base station may further include a receiver configured to receive a WLAN measurement report from the user equipment. The handover request message may include information on the WLAN measurement report.

The controller may receive a handover request acknowledge message from the target base station. The handover request acknowledge message may include information indicating that the WLAN termination device holds context information on the user equipment.

A target base station according to one embodiment includes a controller configured to receive, from a source base station, a handover request message for a user equipment to which a WLAN mobility set is set. The handover request message includes an identifier of a WLAN termination device associated with an identifier of a WLAN access point included in the WLAN mobility set.

The controller may transmit, to the WLAN termination device, a WT addition request message on the basis of the identifier of the WLAN termination device.

The handover request message may include the WLAN mobility set.

The controller may transmit, to the WLAN termination device, a WT addition request message in response to the reception of the handover request message. The WT addition request message may include the WLAN mobility set.

The handover request message may include information on a WLAN measurement report from the user equipment. The controller may transmit, to the WLAN termination device, a WT addition request message in response to the reception of the handover request message. The WT addition request message may include a WLAN mobility set based on the information on the WLAN measurement report.

The controller may transmit, to the WLAN termination device, a WT addition request message in response to the reception of the handover request message. The controller may receive a WT addition request acknowledge message from the WLAN termination device. The WT addition request acknowledge message may include information indicating that the WLAN termination device holds context information on the user equipment. The controller may transmit, to the source base station, a handover request acknowledge message in response to the reception of the WT addition request acknowledge message. The handover request acknowledge message may include the information.

The controller may transmit, to the WLAN termination device, a WT addition request message in response to the reception of the handover request message. The WT addition request message may include a WLAN mobility set candidate that is to be provided to the user terminal by the target base station. The controller may receive a WT addition request reject message based on the WLAN mobility set.

The WT addition request reject message may include reason information indicating that the WLAN mobility set candidate does not match the WLAN mobility set that is set to the user terminal.

The WT addition request reject message may include the WLAN mobility set that is set to the user terminal.

A case in which an LTE system being a cellular communication system configured in compliance with the 3GPP standards, can be linked with a wireless LAN (WLAN: Wireless Local Area Network) system will be exemplified and described below with reference to drawings.

(System Configuration)

Figure 1:
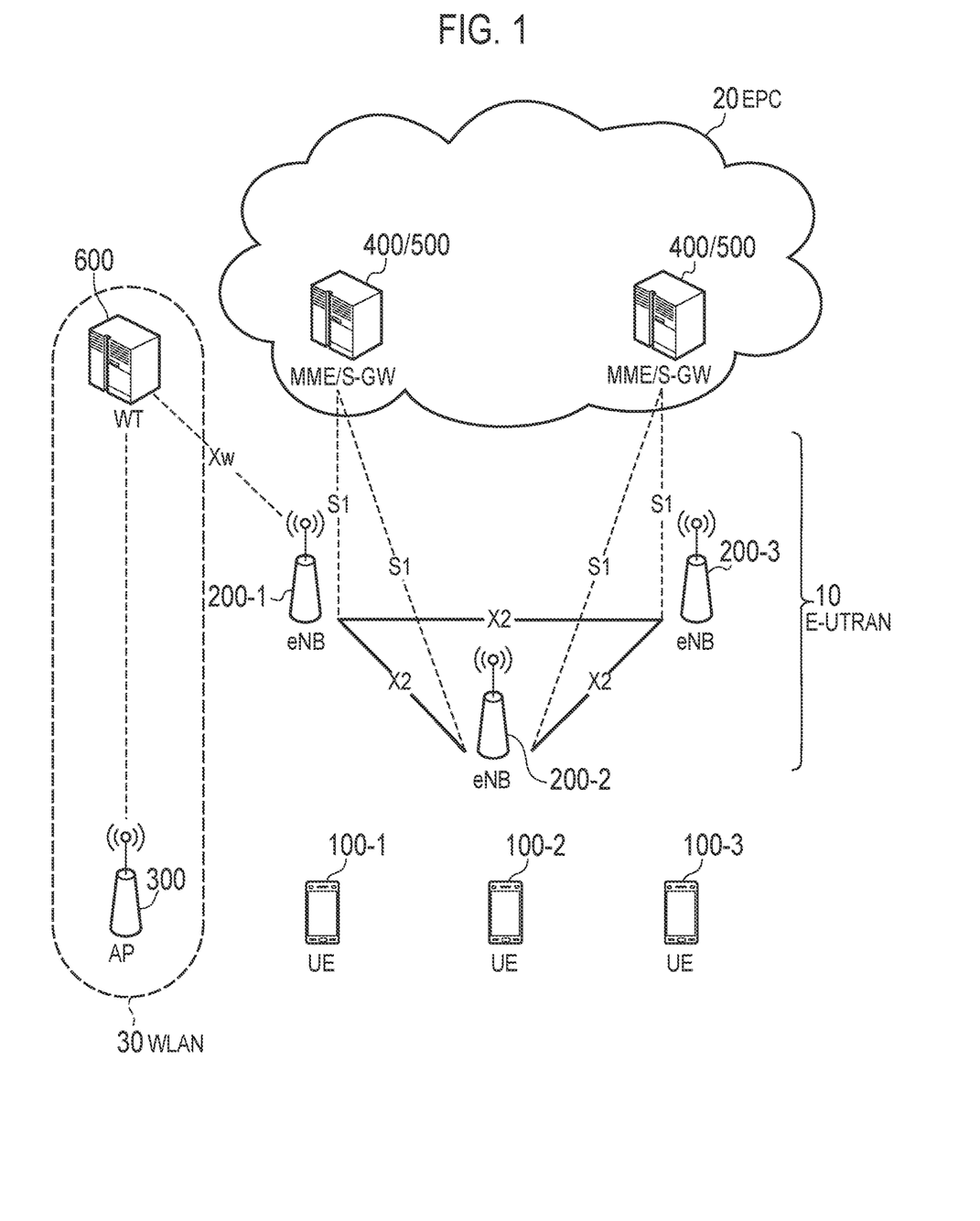
FIG. 1 is a diagram illustrating a system configuration.

FIG. 1 is a system configuration diagram according to an embodiment. As illustrated in FIG. 1, a cellular communication system includes a plurality of UEs (User Equipments) 100, an E-UTRAN (Evolved-UMTS Terrestrial Radio Access Network) 10, and an EPC (Evolved Packet Core) 20.

The E-UTRAN 10 corresponds to a cellular radio access network (RAN). The EPC 20 corresponds to a core network. The E-UTRAN 10 and the EPC 20 constitute a network of the LTE system.

UE 100 is a user apparatus (radio terminal). The UE 100 is a mobile radio communication apparatus. The UE 100 is a terminal (dual terminal) supporting both communication methods of cellular communication and WLAN communication.

The E-UTRAN 10 includes a plurality of eNBs 200 (evolved Nodes-B). The eNB 200 corresponds to a base station. The eNB 200 manages one or a plurality of cells. The eNB 200 performs radio communication with the UE 100 with which a connection is established with a cell of the eNB 200. It is noted that the "cell" is used as a term indicating a minimum unit of a radio communication area. The "cell" may be also used as a term indicating a function of performing radio communication with the UE 100. Further, the eNB 200 has a radio resource management (RRM) function, a routing function of user data, and a measurement control function for mobility control and scheduling, for example.

The eNBs 200 are connected with one another via an X2 interface. Further, the eNB 200 is connected via an S1 interface to an MME (Mobility Management Entity) 400 and an SGW (Serving-Gateway) 500 included in the EPC 20. The eNB 200 is connected to the WT 600 described later via an Xw interface.

The EPC 20 includes a plurality of MMEs (Mobility Management Entities) 400/SGWs (Serving-Gateways) 500. The MME 400 is a network node that performs various mobility controls, etc., on the UE 100, and corresponds to a controller. The SGW 500 is a network node that performs control to transfer user data, and corresponds to a switching center.

The WLAN 30 includes a WLAN access point (hereinafter referred to as "AP") 300 and a WLAN terminating apparatus (hereinafter referred to as "WT") 600. The AP 300 is, for example, an AP (Operator controlled AP) managed by an NW (Network) operator of the LTE system.

The WT 600 is a logical node. The WT 600 is connected to the eNB 200 via the Xw interface. The WT 600 terminates the Xw interface with respect to the WLAN. The Xw interface is constituted of an Xw user plane interface (Xw-U) and an Xw control plane interface (Xw-C). Xw-U is used to carry data (LWA PDU) between the eNB 200 and the WT 600. Xw-C is used to carry control signals between the eNB 200 and the WT 600.

The WT 600 is associated with one or more APs 300. The WT 600 transmits or receives data to the UE 100 via the associated APs 300. The WT 600 holds the identifier of the associated AP 300.

The WLAN 30 is configured in conformity with, for example, IEEE 802.11 standards. The AP 300 performs WLAN communication with the UE 100 in a frequency band different from the cellular frequency band. Generally, WLAN communication is performed in unlicensed band. Cellular communication is performed in a licensed band. The AP 300 is connected to the EPC 20 via a router or the like.

Figure 2:
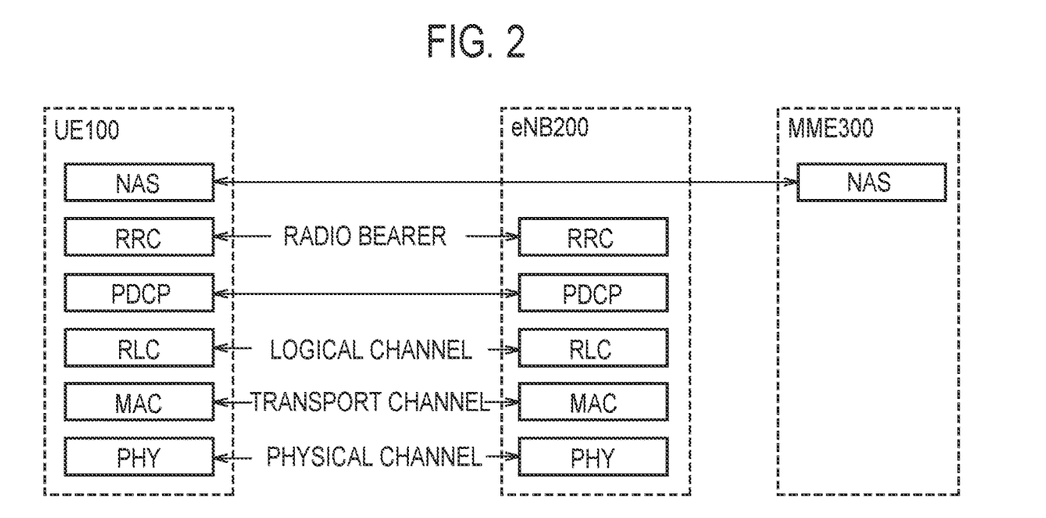
FIG. 2 is a diagram of a protocol stack of a radio interface in an LTE system.

FIG. 2 is a protocol stack diagram of a radio interface in the cellular communication system. As illustrated in FIG. 2, the radio interface protocol is classified into a layer 1 to a layer 3 of an OSI reference model. The layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, user data and control signal are transmitted via the physical channel.

The MAC layer performs preferential control of data, and a retransmission process by hybrid ARQ (HARQ), a random access procedure and the like. Between the MAC layer of the UE 100 and the MAC layer of the eNB 200, data is transmitted via a transport channel. The MAC layer of the eNB 200 includes a scheduler. The scheduler decides a transport format (a transport block size, a modulation and coding scheme, and the like) of an uplink and a downlink, and an assigned resource block.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer (RRC entity) is defined only in a control plane. Between the RRC layer of the UE 100 and the RRC layer of the eNB 200, a message (an RRC message) for various types of setting is transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in a connected state (connected state). Otherwise, the UE 100 is in an idle state (idle state).

A NAS (Non-Access Stratum) layer positioned above the RRC layer performs session management or mobility management, for example. The MME 300 exchange NAS messages with the UE 100.

(LWA)

Figure 3:
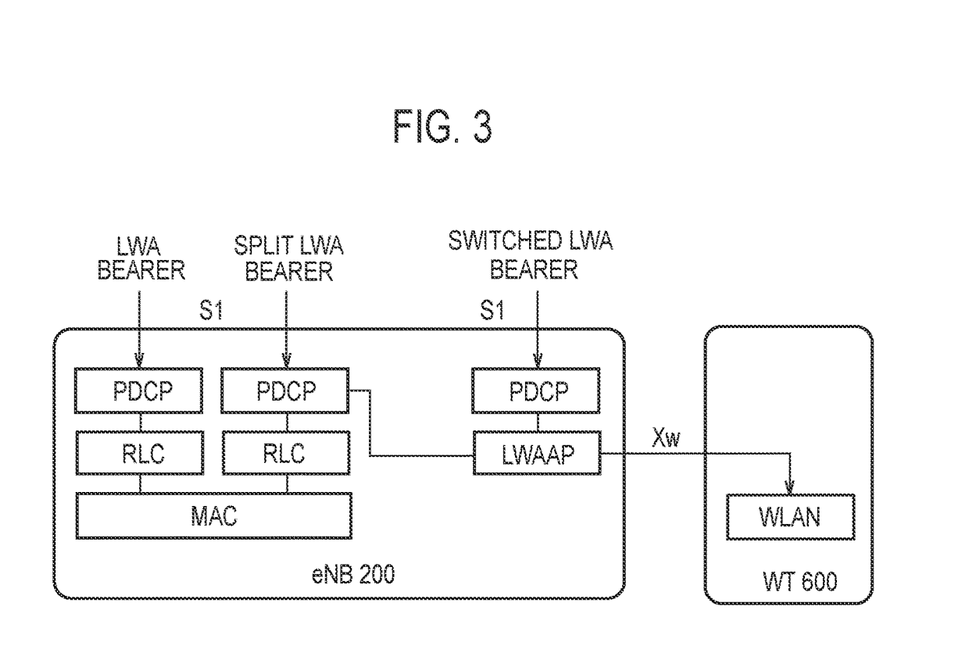
FIG. 3 is a diagram illustrating a radio protocol architecture of an eNB used in LWA.

LWA (LTE-WLAN Aggregation) will be described by using FIG. 3. FIG. 3 illustrates a radio protocol architecture of an eNB 200 used in the LWA.

The E-UTRAN 10 supports an LWA operation. In the LWA, to use radio resources of LTE and WLAN, a UE 100 in an RRC connected state is configured by the eNB 200.

As illustrated in FIG. 3, in the LWA, an LWAAP (LTE-WLAN Aggregation Adaptation Protocol) entity is arranged in the eNB 200. The LWAAP entity generates an LWA PDU. The LWA PDU is a PDU (Protocol Data Unit) including a DRB (Data Radio Bearer) identifier (DRB ID) generated through the LWAAP entity for transmission via the WLAN 30 in the LWA. The WT 600 uses LWA EtherType for transferring data to the UE 100 via the WLAN 30. The UE 100, to decide that the received PDU belongs to the LWA bearer, uses the LWA EtherType. The UE 100 uses the DRB identifier to decide an LWA bearer to which the PDU belongs.

In the LWA, there exists a bearer (an LWA bearer) in which data (packet) is transmitted by using only a radio resource of the eNB 200 (LTE).

The LWA has two types of bearers. The two types of bearers include a split LWA bearer and a switched LWA bearer.

The split LWA bearer is a bearer in which a radio protocol is located in both the eNB 200 and the WLAN 30 to use radio resources of the eNB 200 and the WLAN 30, in the LWA. The split LWA bearer is a bearer that is split in the PDCP layer. In one split bearer, data is transmitted by using a radio resource of the eNB 200. The data is transmitted via the PDCP layer (a first PDCP layer), the RLC layer, and the MAC layer. In the other split bearer, data is transmitted by using a radio resource of the WLAN 30. The data is transmitted from the PDCP layer to the WT 600 via the LWAAP. The data is transmitted to the UE 100 via a WLAN layer (WLAN entity) in the WT 600 and the AP 300.

The switched LWA bearer is a bearer in which a radio protocol is located in both the eNB 200 and the WLAN 30 in the LWA, but only a radio resource of the WLAN 30 is used. In the switched LWA bearer, similarly to the other split bearer described above, the data is transmitted from the PDCP layer (a second PDCP layer) to the WT 600 via the LWAAP.

A case in which the LWA is used for transmission of downlink data (packet) was described, but a case in which the LWA is used for transmission of uplink data (packet) is also similar.

However, a destination (the PDCP layer) of data (packet) transmitted from the UE 100 to the eNB 200 via the WLAN 30 varies depending on a bearer to which the data belongs. The LWAAP decides a PDCP to be transmitted, based on a DRB identifier included in the data (packet). The LWAAP, if the data belongs to the split LWA bearer (that is, the data includes an identifier of the split LWA bearer), sends the data to the first PDCP layer. In the first PDCP layer, the data is combined with data (packet) transmitted from the RLC layer. The first PDCP layer sends the combined data to a high-level node (the MME 400/SGW 500). On the other hand, the LWAAP, if the data belongs to the switched LWA bearer (that is, the data includes an identifier of the switched LWA bearer), sends the data to the second PDCP layer. The second PDCP layer sends the data to a high-level node (the MME 400/SGW 500).

(WLAN Mobility Set)

Next, a WLAN mobility set will be described. The WLAN mobility set is a set of one or more APs 300 to be identified by one or more WLAN identifiers (for example, a BSSID (Basic Service Set ID), an HESSID (Homogenous Extended Service Set ID), an SSID (Service Set ID), etc. The UE 100 may, without notifying the eNB 200, execute mobility among the APs 300 belonging to the WLAN mobility set.

The eNB 200 provides a WLAN mobility set to the UE 100. If a WLAN mobility set is configured for the UE 100, the UE 100 attempts a connection with a WLAN 30 (AP 300) having an identifier that matches with one of the configured WLAN mobility set. The mobility of the UE 100 to an AP 300 not belonging to the WLAN mobility set is controlled by the eNB 200. For example, the eNB 200 updates the WLAN mobility set, based on a measurement report provided by the UE 100. The UE 100 connects with one WLAN mobility set (APs 300) at most at one time. All the APs belonging to the WLAN mobility set share a common WT 600 that terminates the Xw-C and the Xw-U. WLAN identifiers belonging to the WLAN mobility set may be some (a subset) of all WLAN identifiers associated with the WT 600.

(WLAN Measurement Report)

A UE 100 supporting the LWA may be configured by the eNB 200 (E-UTRAN 10) to execute a WLAN measurement report. A WLAN measurement target may be configured by at least one of a WLAN identifier, a WLAN channel number, and a WLAN band.

The WLAN measurement report is triggered by using the received strength (RSSI: Received Signal Strength Indicator) of a radio signal (for example, a beacon signal) from the AP 300. The WLAN measurement report may include an RSSI, channel utilization, a station count, an admission capacity, a backhaul rate, and a WLAN identifier.

(Radio Terminal)

Figure 4:
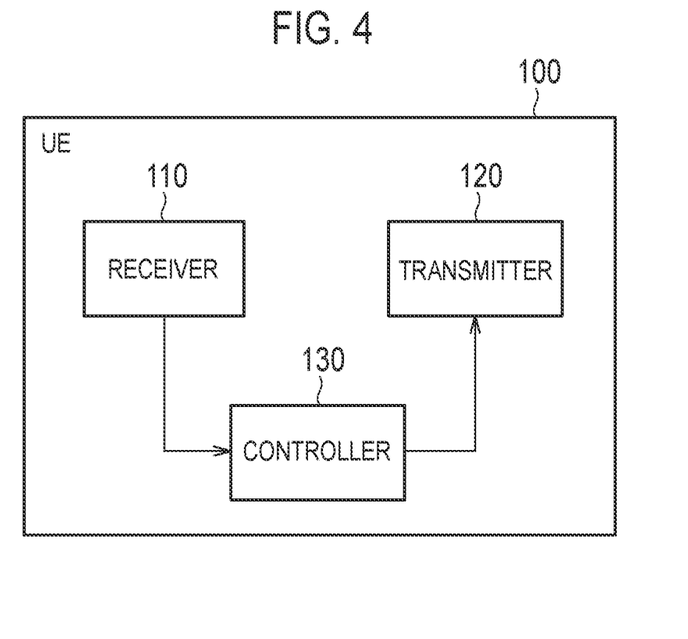
FIG. 4 is a block diagram illustrating an UE 100.

A configuration of the UE 100 (radio terminal) will be described, below. FIG. 3 is a block diagram illustrating the UE 100.

As illustrated in FIG. 4, the UE 100 includes a receiver 110, a transmitter 120, and a controller 130. The receiver 110 and the transmitter 120 may be unified as one in the form of a transceiver. Further, the UE 100 may include a receiver 110 and a transmitter 120 used in common in cellular communication and WLAN communication. The UE 100 may include a receiver 110 and a transmitter 120 for cellular communication. The UE 100 may include a receiver 110 and a transmitter 120 for WLAN communication.

The receiver 110 performs various types of receptions under the control of the controller 130. The receiver 110 includes an antenna. The receiver 110 converts a radio signal received by the antenna into a baseband signal (received signal), and outputs the baseband signal to the controller 130.

The transmitter 120 performs various types of transmissions under the control of the controller 130. The transmitter 120 includes an antenna. The transmitter 120 converts a baseband signal (transmission signal) output from the controller 130 into a radio signal, and transmits the radio signal from the antenna.

The controller 130 performs various types of controls in the UE 100. The controller 130 can control the receiver 101 and the transceiver 102. The controller 130 includes a processor and a memory. The memory stores a program to be executed by the processor, and information to be used for a process by the processor. The processor includes a baseband processor and a CPU (Central Processing Unit). The baseband processor performs modulation and demodulation, encoding and decoding and the like of a baseband signal. The CPU performs various processes by executing the program stored in the memory. The controller 130 executes various types of processes described later, and various types of communication protocols described above.

In the present specification, processing performed by at least one of the receiver 110, the transmitter 120, and the controller 130 of the UE 100 will be described as a process (operation) executed by the UE 100 for the sake of convenience.

(Base Station)

Figure 5:
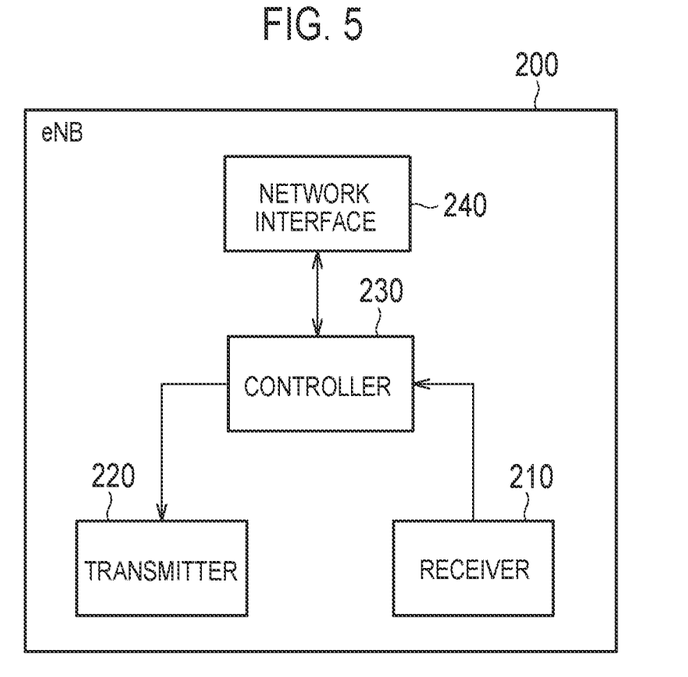
FIG. 5 is a block diagram illustrating an eNB 200.

A configuration of the eNB 200 (base station) will be described, below. FIG. 5 is a block diagram illustrating the eNB 200.

As illustrated in FIG. 5, the eNB 200 includes a receiver 210, a transmitter 220, a controller 230, and a network interface 240. The receiver 210 and the transmitter 220 may be unified as one in the form of a transceiver.

The receiver 210 performs various types of receptions under the control of the controller 230. The receiver 210 includes an antenna. The receiver 210 converts a radio signal received by the antenna into a baseband signal (received signal), and outputs the baseband signal to the controller 230.

The transmitter 220 performs various types of transmissions under the control of the controller 230. The transmitter 220 includes an antenna. The transmitter 220 converts a baseband signal (transmission signal) output from the controller 230 into a radio signal, and transmits the radio signal from the antenna.

The controller 230 performs various types of controls in the eNB 200. The controller 230 can control the receiver 210, the transmitter 220, and the network interface 240. The controller 230 includes a processor and a memory. The memory stores a program to be executed by the processor, and information to be used for a process by the processor. The processor includes a baseband processor and a CPU (Central Processing Unit). The baseband processor performs modulation and demodulation, encoding and decoding and the like of a baseband signal. The CPU performs various processes by executing the program stored in the memory. The controller 230 executes various types of processes described later, and various types of communication protocols described above.

The network interface 240 is connected to a neighbour eNB 200 via the X2 interface. The network interface 240 is connected to the MME 400 and SGW 500 via the S1 interface. The network interface 240 is used for communication performed over the X2 interface, communication performed over the S1 interface, and the like.

Further, the network interface 240 is connected to the WT 600 via the Xw interface. The network interface 240 is used for communication performed over the Xw interface, and the like.

In the present specification, processes performed by at least one of the receiver 210, the transmitter 220, the controller 230 and the network interface 240 included in the eNB 200 will be described as processes (operations) executed by the eNB 200 for convenience.

(Wireless LAN Access Point)

Figure 6:
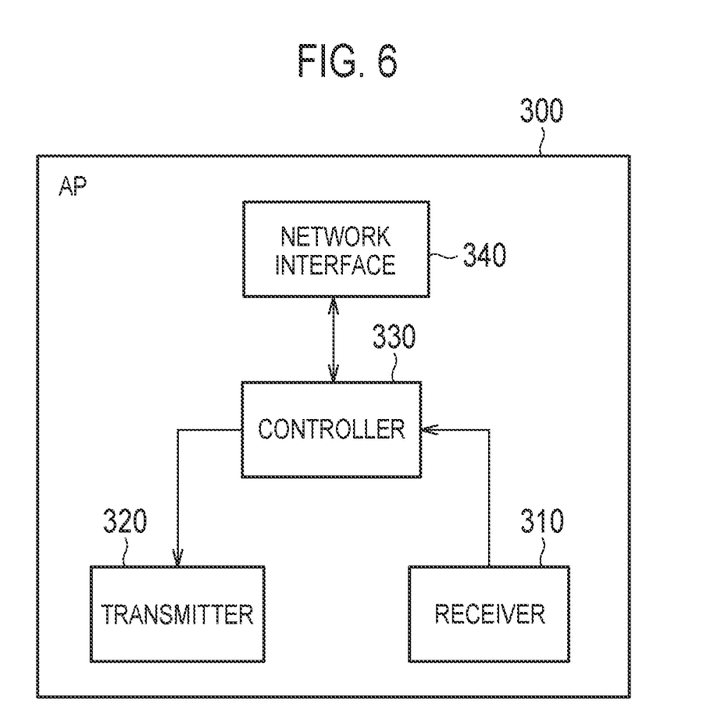
FIG. 6 is a block diagram illustrating an AP 300.

Next, a configuration of the AP 300 (wireless LAN access point) will be described. FIG. 6 is a block diagram illustrating the AP 300.

As illustrated in FIG. 6, the AP 300 includes a receiver 310, a transmitter 320, a controller 330, and a network interface 340. The receiver 310 and the transmitter 320 may be an integrated transceiver.

The receiver 310 performs various types of receptions under the control of the controller 330. The receiver 310 includes an antenna. The receiver 310 converts a radio signal received by the antenna into a baseband signal (received signal), and outputs the baseband signal to the controller 330.

The transmitter 320 performs various types of transmissions under the control of the controller 330. The transmitter 320 includes an antenna. The transmitter 320 converts a baseband signal (transmission signal) output from the controller 330 into a radio signal to be transmitted from the antenna.

The controller 330 performs various types of controls in the AP 300. The controller 330 can control the receiver 310, the transmitter 320, and the network interface 340. The controller 330 includes a processor and a memory. The memory stores a program to be executed by the processor, and information to be used for a process by the processor. The processor includes a baseband processor and a CPU. The baseband processor performs modulation and demodulation, coding and decoding, and the like, of the baseband signal. The CPU executes a program stored in the memory to perform various types of processes. The controller 330 executes various types of processes described later, and various types of communication protocols described above.

The network interface 340 is connected to a backhaul via a predetermined interface. The network interface 340 is connected to the WT 600, and is used for communication with the WT 600, and the like.

For simplicity, a process executed by at least one of the receiver 310, the transmitter 320, the controller 330, and the network interface 340 included in the AP 300 is described herein as a process (operation) executed by the AP 300.

(WLAN Termination Device)

Figure 7:
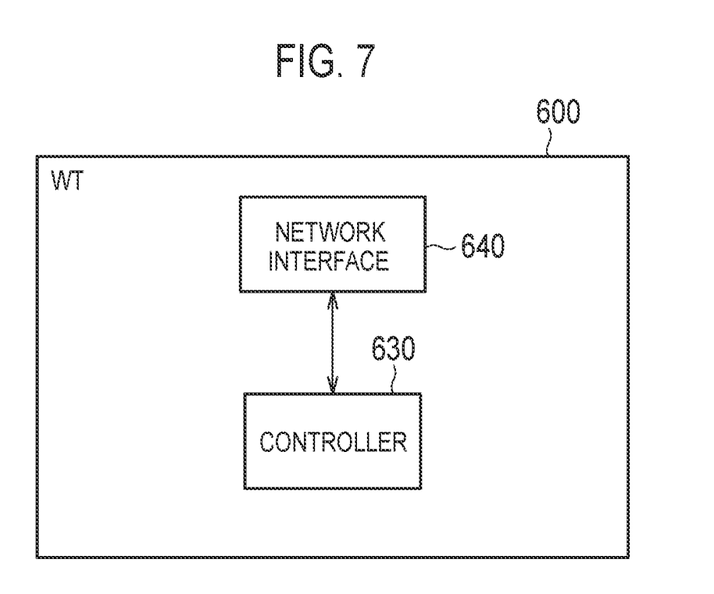
FIG. 7 is a block diagram illustrating a WT 600.

A configuration of the WT 600 (WLAN termination device) will be described. FIG. 7 is a block diagram illustrating the WT 600.

As illustrated in FIG. 7, the WT 600 includes a controller 630 and a network interface 640.

The controller 630 performs various types of controls in the WT 600. The controller 630 can control the network interface 640. The controller 630 includes a processor and a memory. The memory stores a program to be executed by the processor, and information to be used for a process by the processor. The processor includes a baseband processor and a CPU. The baseband processor performs modulation and demodulation, coding and decoding, and the like, of the baseband signal. The CPU executes a program stored in the memory to perform various types of processes. The controller 630 executes various types of processes described later, and various types of communication protocols described above.

The network interface 640 is connected to a backhaul via a predetermined interface. The network interface 640 is connected to the AP 300, and is used for communication with the AP 300, and the like.

The network interface 640 is connected to the eNB 200 via the Xw interface. The network interface 640 is used for communication performed over the Xw interface, and the like.

For simplicity, a process executed by at least one of the controller 630 and the network interface 640 included in the WT 600 is described herein as a process (operation) executed by the WT 600.

Operation According to Embodiment

Figure 8:
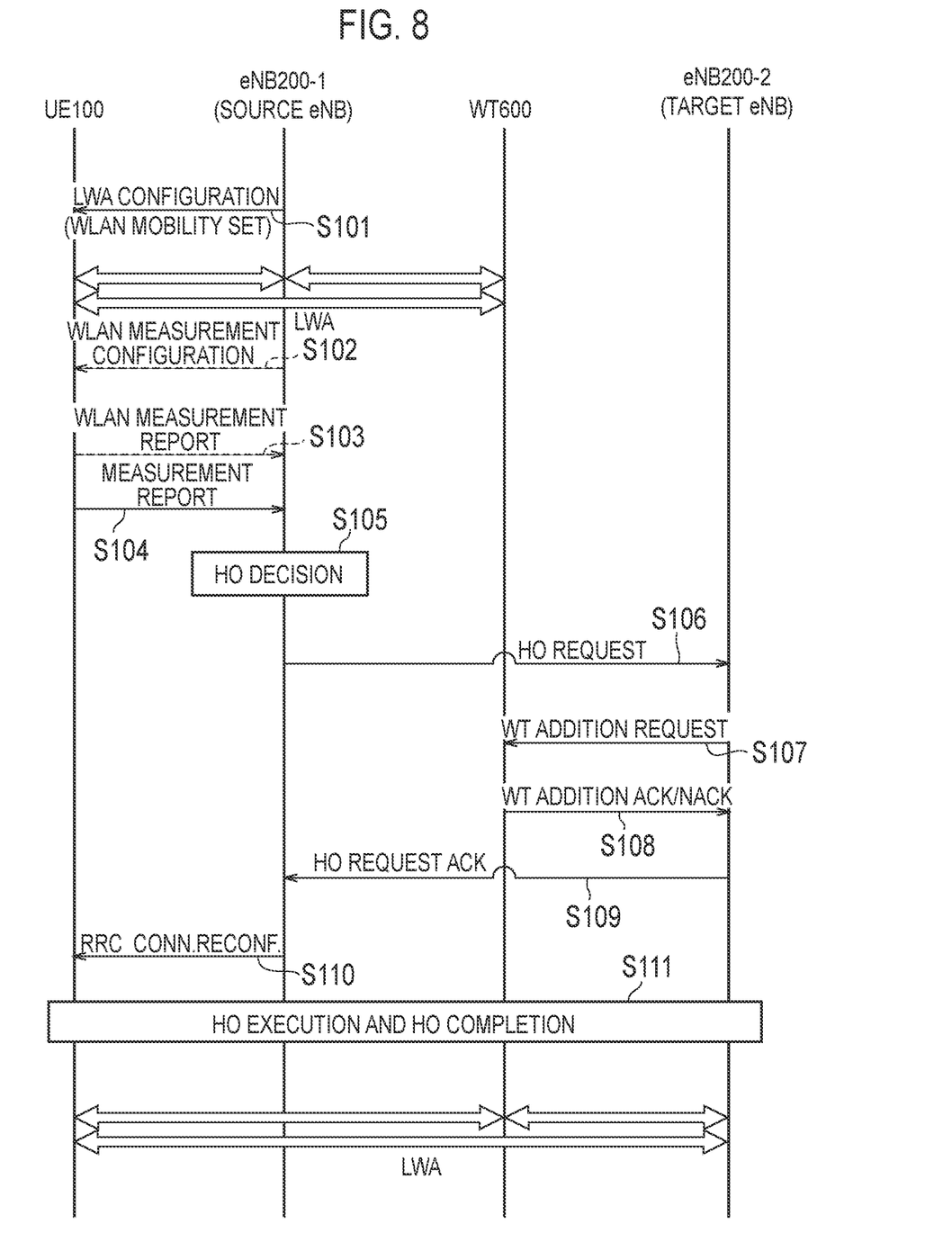
FIG. 8 is a sequence chart for describing an operation according to an embodiment.

An operation according to an embodiment will be described by using FIG. 8. FIG. 8 is a sequence chart for describing the operation according to the embodiment.

In FIG. 8, the UE 100 is located in a cell (Primary Cell) managed by the eNB200-1 (Source eNB200-1). In an initial state, the UE 100 is in the RRC connected state.

In step S101, the eNB 200-1 transmits LWA settings (LWA configuration) to the UE 100. The UE100 is set (configured) for LWA. The eNB 200-1 may transmit the LWA settings to the UE 100 by individual signaling (for example, an "RRC Connection Reconfiguration" message).

The LWA settings include the WLAN mobility set. Accordingly, the eNB 200 sets the WLAN mobility set to the UE 100 (configures the UE 100 with the WLAN mobility set). The UE 100 is set (configured) with the WLAN mobility set. The WLAN mobility set includes an identifier of the AP 300 associated with the WT 600. That is, the WT 600 can transfer data of the UE 100 to the UE 100 or the eNB 200 via the AP 300 identified by the identifier of the AP 300.

The UE 100 can perform an LWA operation. The UE 100 can communicate with the eNB 200 by using not only the radio resources of the eNB 200 but also the radio resources of the WLAN 30.

In step S102, the eNB 200 may transmit WLAN measurement settings (WLAN Measurement configuration) to the UE 100. Accordingly, the UE 100 is set (configured) to provide a WLAN measurement report.

In step S103, the UE 100 may transmit the WLAN measurement report to the eNB 200-1. The UE 100 transmits the WLAN measurement report to the eNB 200-1 by using the RSSI based on a radio signal from the AP 300 as a trigger. The eNB 200 receives the WLAN measurement report from the UE 100.

In step S104, the UE 100 transmits a measurement report (Measurement Report) to the eNB 200-1. The eNB 200 receives the measurement report from the UE 100. The measurement report includes measured values of a reception level (for example, received power: RSRP (Reference Signal Received Power) and/or received quality: RSRQ (Reference Signal Received Quality)) of the received signal from the eNB 200 (cell).

In step S105, the eNB 200-1 decides a handover to the eNB 200-2 on the basis of the measurement report.

In step S106, the eNB 200-1 transmits a handover request message to the eNB 200-2 in response to the decision of the handover.

The handover request message is a message for requesting the preparation of a resource for the handover. The handover request message is a message for passing information required to prepare the handover at the target side.

The handover request message may include an identifier of the WT 600 (e.g., WT ID). The identifier of the WT 600 indicates the WT 600 associated with the identifier of the AP 300 included in the WLAN mobility set that is set to the UE 100. That is, the WT 600 and the AP 300 included in the WLAN mobility set are associated with each other. The WT 600 manages that AP 300.

The handover request message may include an identifier of the UE 100. The identifier of the UE 100 is, for example, at least one of UE ID and WT UE XwAP ID. The UE ID indicates the WLAN MAC address of the UE. The WT UE XwAP ID is the identifier of the UE 100 assigned by the WT 600.

For example, when switching (changing) the WT 600, the eNB 200-2 can skip the operation of obtaining the WLAN MAC address of the UE from the UE 100 (transmission and reception of an RRC message).

The handover request message may include the WLAN mobility set that is set to the UE 100.

The handover request message may include information on the WLAN measurement report from the UE 100. The eNB 200-1 may include, in the handover request message, information on the latest WLAN measurement report received from the UE 100. The information on the WLAN measurement report may be the entire WLAN measurement report received from the UE 100. The information on the WLAN measurement report may be a part of the WLAN measurement report received from the UE100.

The eNB 200-2 receives the handover request message.

When the handover request message includes the identifier of the WT 600, the eNB 200-2 can determine that the UE 100 to be subjected to the handover is set for LWA. The eNB 200-2 can recognize, on the basis of the identifier of the WT 600, the WT 600 associated with the identifier of the AP 300 included in the WLAN mobility set that is set to the UE 100. In other words, the eNB 200-2 can identify the destination of a WT addition request message, which will be described later. Therefore, the eNB 200-2 does not need to transmit the WT addition request message to another WT 600.

In step S107, the eNB 200-2 transmits the WT addition request message (WT Addition Request) to the WT 600. The eNB 200-2 may transmit, on the basis of the identifier of the WT 600 included in the handover request message, the WT addition request message to the WT 600. The eNB 200-2 may transmit, in response to the reception of the handover request message, the WT addition request message to the WT 600.

The WT addition request message is a message for requesting the preparation of a resource for LWA for one particular UE (UE 100).

The WT addition request message may include the identifier of the UE 100 (at least one of UE ID and WT UE XwAP ID) included in the handover request message. This identifier allows the WT 600 to identify the UE 100. Therefore, the WT 600 can determine whether or not the UE 100 is a known one to which the WLAN mobility set is set.

The WT addition request message includes the WLAN mobility set. Here, the WLAN mobility set may be the WLAN mobility set included in the handover request message. This enables the effective use of the WLAN mobility set that is already set to the UE 100.

When the handover request message includes information on the WLAN measurement report from the UE 100, the eNB 200-2 may include, in the WT addition request message, the WLAN mobility set based on the information. The eNB 200-2 can set an appropriate WLAN mobility set to the UE 100 by creating (updating) the WLAN mobility set on the basis of the information on the WLAN measurement report.

The eNB 200-2 may use, as the WLAN mobility set to be included in the WT addition request message, a WLAN mobility set candidate to be provided to the UE 100 by the eNB 200-2. For example, the eNB 200-2 may include, in the WT addition request message, as the WLAN mobility set, a WLAN mobility set candidate created on the basis of the information on the WLAN measurement report.

The WT 600 receives the WT addition request message from the eNB 200. The WT 600 may determine whether or not to acknowledge the WT addition request on the basis of the WLAN mobility set.

In step S108, the WT 600 transmits a response to the WT addition request message to the eNB 200.

The WT 600 may transmit, as the response, a WT addition request acknowledge message (WT Addition Request ACK. (ACKNOWLEDGE)).

The WT addition request acknowledge message is a message (confirmation) for making the eNB 200 confirm the preparation of WT addition.

For example, when the WLAN mobility set included in the WT addition request message matches the WLAN mobility set that is set to the UE 100, the WT 600 may transmit the WT addition request acknowledge message.

When the WLAN mobility set included in the WT addition request message indicates (the identifier of) the AP 300 associated with the WT 600, the WT 600 may transmit the WT addition request acknowledge message.

The WT addition request acknowledge message may include information indicating that the WT 600 holds context information on the UE 100 (for example, the identifier of the UE 100, the WLAN mobility set, etc.).

When receiving the WLAN mobility set (candidate) from the eNB 200-2, the WT 600 may update the WLAN mobility set (candidate). The WT 600 may include, in the WT addition request acknowledge message, the updated WLAN mobility set. For example, the WT 600 may add, from among the identifiers of the AP 300 of the WLAN mobility set that is set to the UE 100, an identifier of the AP 300 not included in the WLAN mobility set (candidate) to the WLAN mobility set (candidate). The WT 600 may include, in the WT addition request acknowledge message, the added WLAN mobility set as an updated WLAN mobility set. The WT 600 may include, in the WT addition request acknowledge message, the WLAN mobility set itself that is set to the UE 100, as an updated WLAN mobility set.

Meanwhile, the WT 600 may transmit, as a response, a WT addition request reject message (WT Addition Request NACK. (NACKNOWLEDGE)).

The WT addition request reject message is a message for notifying the eNB200 of the failure of the preparation of WT addition.

The WT 600 may transmit the WT addition request reject message on the basis of the WLAN mobility set included in the WT addition request message. For example, when the WLAN mobility set included in the WT addition request message includes an identifier of the AP 300 that is not associated with its own device (WT 600), the WT 600 may transmit the WT addition request reject message. When the WLAN mobility set included in the WT addition request message includes an identifier of the AP 300 not included in the WLAN mobility set that is set to the UE 100, the WT 600 may transmit the WT addition request reject message.

The WT addition request reject message may include reason information indicating that the message is based on the WLAN mobility set included in the WT addition request message. For example, the reason information may indicate that the WLAN mobility set (candidate) includes an identifier of the AP 300 that is not associated with the WT 600. The reason information may indicate that the WLAN mobility set (candidate) does not match the WLAN mobility set that is set to a user equipment. The reason information may indicate that the WLAN mobility set (candidate) includes an identifier of the AP 300 not included in the WLAN mobility set that is set to a user equipment.

The WT addition request reject message may include the WLAN mobility set (the identifier of the AP 300) that is set to the UE 100. The eNB 200-2 can recognize the WLAN mobility set (the identifier of the AP 300) that is set to the UE 100.

When receiving the WT addition request reject message, the eNB 200-2 can update the WLAN mobility set on the basis of the reason information and/or the WLAN mobility set that are included in the WT addition request reject message. The eNB 200-2 may transmit a new WT addition request message including the updated WLAN mobility set to the WT 600.

In step S109, the eNB 200-2 transmits a response to the handover request message to the eNB 200-1.

The eNB 200-2 may transmit, as the response, a handover request acknowledge message (HO Request ACK. (ACKNOWLEDGE)). The eNB 200-2 may transmit, in response to the reception of the WT addition request acknowledge message, the handover request acknowledge message.

The handover request acknowledge message is a message for notifying the eNB 200-1 of a resource prepared at the target (eNB 200-2).

The handover request acknowledge message may include holding information indicating that the WT 600 holds context information on the UE 100 (e.g., the WLAN mobility set). The eNB 200-2 may include, in the handover request acknowledge message, the information received from the WT 600 through the WT addition request acknowledge message. The eNB 200-2 may newly create information indicating that the WT 600 holds the context information on the UE 100 to include the created information in the handover request acknowledge message. Thus, the eNB 200-1 can recognize that the WT 600 holds the context information on the UE 100. When the UE 100 executes a handover, the eNB 200-1 usually transmits a WT release request message to the WT 600. The WT release request message is a message for requesting the release of a resource. In response to this, the WT 600 also releases the context information on the UE 100. On the other hand, when the WT 600 holds the context information on the UE 100, the eNB 200-1 may transmit, to the WT 600, the WT release request message including an instruction (information) not to release the context information on the UE 100. The instruction may be the holding information. When receiving the instruction, the WT 600 can release the connection between the eNB 200 and the WT 600 (UE Associated signaling connection (XwAP)) while holding the context information on the UE 100.

The holding information may be different from the existing UE context holding indicator (UE Context Kept Indicator). The UE context holding indicator indicates that the UE context information is held at an SeNB (Secondary eNB) in a case where a handover is executed between MeNBs (Master eNBs) (inter-MeNB) without changing the SeNB. Thus, the eNB 200-1 can recognize that the WT 600 holds the context information on the UE 100 without confusing the holding information with the existing UE context holding indicator.

When a handover is executed between the MeNBs without changing the SeNB in a case where dual connectivity (DC: Dual connectivity) is performed, the eNB 200-2 may include, in the handover request acknowledge message, the holding information and the UE context holding indicator.

The DC is an operating mode of the UE 100 in the RRC connected state, in which a master cell group and a secondary cell group are set. The master cell group is a group of serving cells associated with the MeNB in the DC, and is comprised of a PCell and optionally of one or more SCells. The secondary cell group is a group of serving cells associated with the SeNB, and is comprised of a PSCell and optionally of one or more SCells. The SeNB is the eNB200, which provides an additional radio resource for the UE 100 in DC, not the MeNB.

When the DC is not performed, the eNB 200-2 may use the existing UE context holding indicator (UE Context Kept Indicator) as the holding information. When the DC is not performed, the eNB 200-1 may recognize the existing UE context holding indicator (UE Context Kept Indicator) as the holding information.

Meanwhile, the eNB 200-2 may transmit, as a response, the handover request reject message (HO Request NACK. (NACKNOWLEDGE)). The eNB 200-2 may transmit, in response to the reception of the WT addition request reject message, the handover request reject message.

The handover request reject message is a message for notifying the eNB 200-1 of the failure of the preparation of the handover.

In the following continued description, it is assumed that the eNB 200-2 has transmitted, as a response, the handover request acknowledge message.

In step S110, the eNB 200-1 transmits, to the UE 100, an RRC message (RRC Conn.Reconf.) for executing a handover. The UE 100 starts an operation for executing the handover.

In step S111, operations for a handover execution phase (HO Exceution) and a handover completion phase (HO Completion) are executed.

Thereafter, the UE 100 executes an LWA operation in communication with the eNB 200-2. The eNB 200-2 may perform settings for LWA (WLAN mobility set) to the UE 100. The eNB 200-2 may transmit, to the UE 100, a difference from the LWA settings that are already set to the UE 100.

Thus, a handover can be executed while the WT 600 associated with the WLAN mobility set that is set to the UE 100 is maintained. As a result, even when the handover has been executed, the LWA operation can be performed smoothly. After the handover is completed, it is possible to reduce the signaling (or overhead) for performing new settings for LWA.

Other Embodiments

The contents of the present application are described according to each of the above-described embodiments, but it should not be understood that the discussion and the drawings constituting a part of this disclosure limit the contents of the present application. From this disclosure, various alternative embodiments, examples, and operational technologies will become apparent to those skilled in the art.

In the embodiments described above, a case where the eNB 200-2 transmits the WT addition request message is described, but the embodiments are not limited thereto. The eNB 200 may transmit a WT modification request message (WT Modification Request), instead of the WT addition request message. Thus, the "WT addition request" described above may be replaced by the "WT modification request" as appropriate.

The WT modification request message transmitted from the eNB 200-2 to the WT 600 is a message for requesting the preparation for changing a WT resource for one particular UE. A WT modification request acknowledgment message transmitted from the WT 600 to the eNB 200-2 is a message for confirming (acknowledging) the request from the eNB 200-2 to change the WT resource for the one particular UE. The WT modification request reject message transmitted from the WT 600 to the eNB 200-2 is a message for notifying to the eNB 200-2 that the WT change started by the eNB 200-2 is failed.

In the embodiment described above, although the operations of the UE 100, the eNB 200, and the WT 600 are described using the series of sequences, only a part of the operations may be performed, so that all the operations are not performed.

Although not particularly mentioned in the above-described embodiments, a program for causing a computer to execute each process performed by any one of the above-described nodes (such as the UE 100, the eNB 200, the AP 300, and the WT 600) may be provided. The program may be recorded on a computer-readable medium. If the computer-readable medium is used, it is possible to install the program on a computer. Here, the computer-readable medium recording therein the program may be a non-transitory recording medium. The non-transitory recording medium may include, but not be limited to, a recording medium such as a CD-ROM and a DVD-ROM, for example.

Alternatively, a chip may be provided which is configured by: a memory configured to store a program for performing each process performed by any one of the UE 100, the eNB 200, the AP 300, and the WT 600; and a processor configured to execute the program stored in the memory.

In the above-described embodiment, as one example of a mobile communication system, the LTE system is described; however, the contents of the present disclosure is not limited to the LTE system. The contents of the present disclosure may be applied to systems other than the LTE system.

[Supplementary Note]

(1) Introduction

This supplementary note provides initial considerations of the inter eNB handover without WT change.

(2) Discussion

Figure 9:
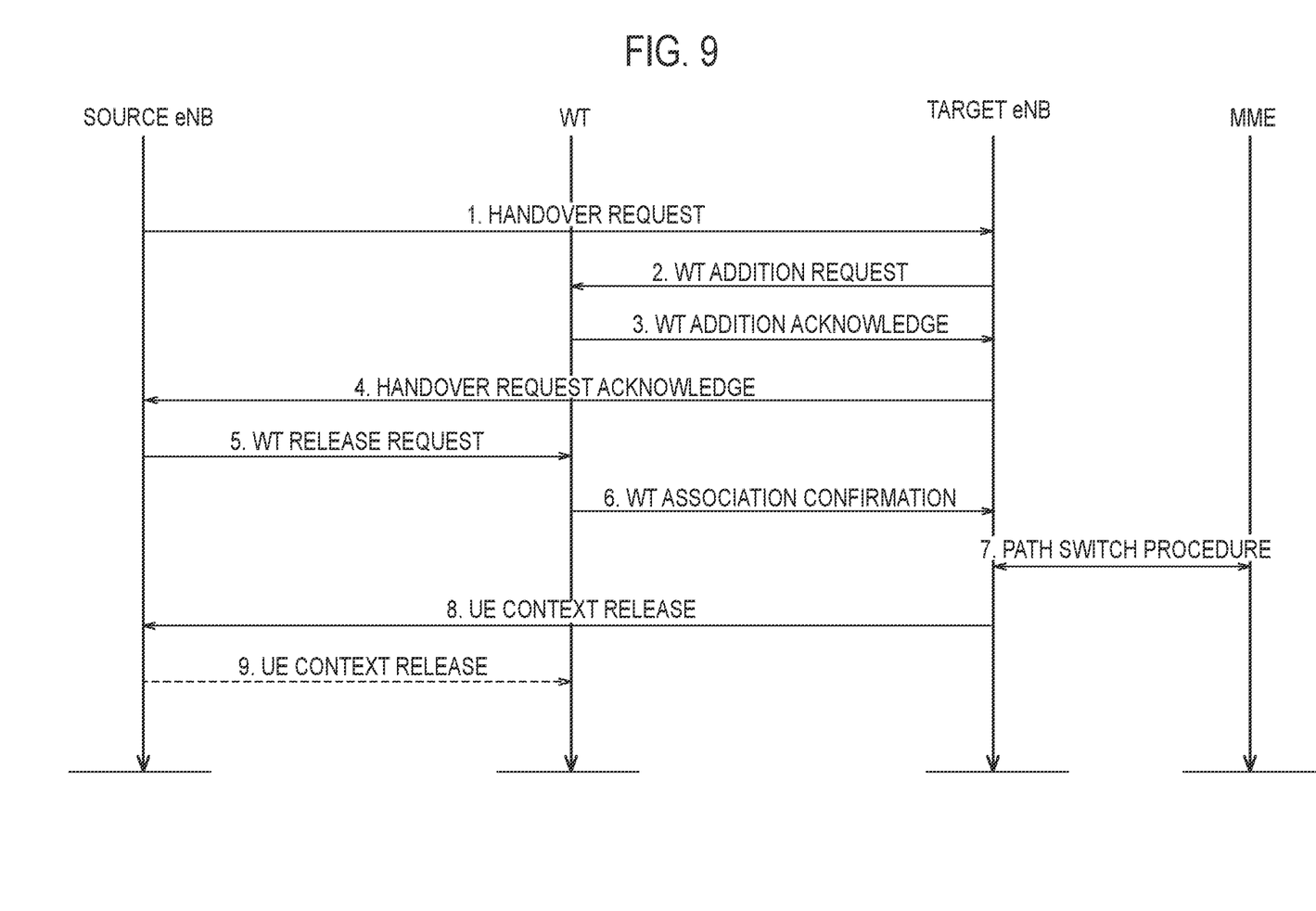
FIG. 9 is a sequence diagram for describing an inter-eNB handover without WT changes.

The UE-associated XwAP procedures were specified in Rel-13 based on the X2 procedures for Rel-12 DC. So, it could be considered as the baseline to discuss on the extension of the inter eNB handover without WT change in consideration with Rel-13 X2 procedures for ExtDC (i.e. the inter MeNB handover without SeNB change). The signalling flow could be depicted in FIG. 9 as a baseline of the inter eNB handover without WT change. FIG. 9 illustrates baseline signalling flow for inter eNB handover without WT change.

Steps 1 & 2. HANDOVER REQUEST & WT ADDITION REQUEST

For ExtDC, HANDOVER REQUEST includes the Global SeNB ID and SeNB UE X2AP ID IEs as the UE Context reference in the SeNB and these information is used in the corresponding SENB ADDITION REQUEST. Correspondingly for eLWA, the WT ID and WT UE XwAP ID IEs would be necessary in HANDOVER REQUEST and the WT UE XwAP ID IE needs to be included in WT ADDITION REQUEST.

In addition to the commonality with ExtDC, a couple of LWA-specific IEs should be discussed.

UE Identity

WT ADDITION REQUEST has the UE Identity IE (i.e., the UE's WLAN MAC address) as the mandatory IE. However, there may be no way for the target eNB to know the identity upon WT ADDITION REQUEST. So, HANDOVER REQUEST also needs to inform of the UE Identity IE, if it's preferred to keep the IE as mandatory in WT ADDITION REQUEST.

Mobility Set

It would be assumed that the source eNB and the target eNB has each Mobility Set, wherein it's possible that a different Mobility Set is provided to the WT during the inter eNB handover without WT change. In this case, it may be an issue if the new mobility set, provided by the target eNB, does not contain the WLAN (e.g., BSSID) which is the UE currently associates with. Thus, either the eNB or the WT check whether the new mobility set is applicable to this LWA. If the target eNB performs the check, it may need to be informed from the source eNB within HANDOVER REQUEST of e.g.,the WLAN measurement results (to be comprehended from RRC Container), the WLAN ID currently associated with the UE and/or the (old) mobility set, depending on the implementation. On the other hand, if the WT performs the check, such an information transfer may not be necessary since it knows the WLAN ID associated with the UE, but it's done blindly from the target eNB point of view, i.e., the target eNB does not know the WLAN is included in its mobility set. In order to avoid such an ambiguity operation, it may be preferable the eNB has the responsibility.

Step S3. WT ADDITION REQUEST ACKNOWLEDGE

If the WT is able to admit the WLAN resource request, it responds with the WT ADDITION REQUEST ACKNOWLEDGE. For the abnormal case where the WT receives a WT UE XwAP ID IE that does not match any existing UE Context that has such ID, the WT could reject the procedure using the WT ADDITION REQUEST REJECT, as similar to the case of ExtDC.

Step S4. HANDOVER REQUEST ACKNOWLEDGE

According to the existing procedure for ExtDC, the target eNB may indicate to the source MeNB whether the UE Context is kept in the WT. For this indication, the existing UE Context Kept Indicator IE may be reused as long as the source eNB does not need to differentiate between eLWA and ExtDC, i.e., simultaneous execution of the inter eNB handover without WT change and the inter MeNB handover without SeNB change is not allowed. It makes sense since the LWA and DC co-deployment is excluded in this release.

Step S5. WT RELEASE REQUEST

Similar to the assumption in the HANDOVER REQUEST ACKNOWLEDGE, the UE Context Kept Indicator IE may be reused. The IE facilitates the WT to understand that only the resources related to the UE-associated signalling connection towards the source eNB should be released.

Step S6. WT ASSOCIATION CONFIRMATION

The WT may send this message to the target eNB after a successful association.

Whether the re-association for the UE is needed or not is up to RAN2.

The WT which would be kept can know when the direction of UL user data transmission is switched from the source eNB to the target eNB by re-association completion between the WT and the UE as trigger.

Step S7. Path Switch Procedure

The target eNB performs the Path Switch procedure as it is the normal handover, since LWA operation is transparent to a MME.

Step S8. UE CONTEXT RELEASE from the Target eNB to the Source eNB

The target eNB sends this message to the source eNB, as it is today.

Step S9. UE CONTEXT RELEASE from the Source eNB to the WT

According to the existing procedure for ExtDC, UE CONTEXT RELEASE is initiated by the source MeNB to make the SeNB release C-plane related resource associated to the UE context towards the source MeNB. In the case of eLWA, it's not the same since UE CONTEXT RELEASE has not been specified in XwAP so far. RAN3 should consider whether the WT RELEASE REQUEST can be used for this purpose i.e., can WT only release the C-plane related resource after the step 5. If needed, a new UE Context Release procedure may be introduced in XwAP.

Table 1 shows the summary of changes to support the inter eNB handover without WT change. It may also be applicable to the scenario for the inter eNB handover with WT addition if it needs to be supported,

TABLE 1

| Messages | Addtional IEs | Issues/Notes |
|---|---|---|
| 1. HANDOVER REQUEST | WT ID UE Identity WT UE XwAP ID | How to check whether the new mobility set contains the WLAN currently associated with the UE. |
| 2. WT ADDITION REQUEST | WT UE XwAP ID | — |
| 3. WT ADDITION ACKNOWLEDGE | — | Considering an abnormal case. |
| 4. HANDOVER REQUEST ACKNOWLEDGE | UE Context Kept Indicator IE. | Whether to reuse the existing UE Context Kept Indicator IE. |
| 5. WT RELEASE REQUEST | UE Context Kept Indicator IE. | Whether to reuse the existing UE Context Kept Indicator IE. |
| 9. UE CONTEXT RELEASE from the source eNB to the WT | — | Whether to specify the new UE Context Release procedure in XwAP |

Proposal 1: It should take into account the consideration above.

The invention claimed is:
1. A communication method, comprising:
setting, by a first base station, a WLAN (Wireless Local Area Network) mobility set that is a set of one or more WLAN identifiers to a user equipment;
deciding, by the first base station, a handover of the user equipment to a second base station;
including, by the first base station, in a handover request message for the user equipment, an identifier of a WLAN termination device associated with the one or more WLAN identifiers; and
transmitting, by the first base station, the handover request message including the identifier of the WLAN termination device to the second base station; and
receiving, by the first base station, a handover request acknowledge message from the second base station, wherein
the handover request acknowledge message includes holding information indicating that the WLAN termination device holds a context of the user equipment.

2. The communication method according to claim 1, comprising:
   transmitting, by the second base station, to the WLAN termination device identified based on the identifier of the WLAN termination device, a WLAN addition request message for requesting preparation of a resource for the user equipment.

3. The communication method according to claim 1, comprising:
   including, by the first base station, in the handover request message, an identifier of the user equipment assigned by the WLAN termination device; and
   transmitting, by the first base station, the handover request message including the identifier of the user equipment to the second base station.

4. The communication method according to claim 3, comprising:
   including, by the second base station, in a WLAN addition request message for requesting preparation of a resource for the user equipment, the identifier of the user equipment assigned by the WLAN termination device; and
   transmitting, by the second base station, the WLAN addition request message including an identifier of the identifier of the user equipment to the WLAN termination device.

5. The communication method according to claim 4, comprising:
   transmitting, by the WLAN termination device, a WLAN addition request acknowledge message that is a response to the WLAN addition request message to the second base station.

6. The communication method according to claim 1, comprising:
   including, by the first base station, in a WT release message for requesting release of a resource for the user equipment, holding information indicating that the WLAN termination device holds a context of the user equipment; and
   transmitting, by the first base station, the WT release message including the holding information to the WLAN termination device.

7. A processor controlling a first base station, the processor being configured to execute the processes of:
   setting a WLAN (Wireless Local Area Network) mobility set that is a set of one or more WLAN identifiers to a user equipment;
   deciding a handover of the user equipment to a second base station;
   including, in a handover request message for the user equipment, an identifier of a WLAN termination device associated with the one or more WLAN identifiers;
   transmitting the handover request message including the identifier of the WLAN termination device to the second base station; and
   receiving a handover request acknowledge message from the second base station, wherein
   the handover request acknowledge message includes holding information indicating that the WLAN termination device holds a context of the user equipment.

8. A first base station, comprising:
   a controller, wherein
   the controller is configured to:
      set a WLAN (Wireless Local Area Network) mobility set that is a set of one or more WLAN identifiers to a user equipment,
      decide a handover of the user equipment to a second base station,
      include, in a handover request message for the user equipment, an identifier of a WLAN termination device associated with the one or more WLAN identifiers,
      transmit the handover request message including the identifier of the WLAN termination device to the second base station, and
      receive a handover request acknowledge message from the second base station, wherein
   the handover request acknowledge message includes holding information indicating that the WLAN termination device holds a context of the user equipment.

9. A processor controlling a second base station, the processor being configured to execute the processes of:
   receiving, from a first base station, a handover request message for a user equipment to which a WLAN (Wireless Local Area Network) mobility set that is a set of one or more WLAN identifiers is set, the handover request message including an identifier of a WLAN termination device associated with the one or more WLAN identifiers, and
   transmitting a handover request acknowledge message to the first base station, wherein
   the handover request acknowledge message includes holding information indicating that the WLAN termination device holds a context of the user equipment.

10. A second base station, comprising:
    a controller, wherein
    the controller is configured to:
       receive, from a first base station, a handover request message for a user equipment to which a WLAN (Wireless Local Area Network) mobility set that is a set of one or more WLAN identifiers is set, the handover request message including an identifier of a WLAN termination device associated with the one or more WLAN identifiers, and
       transmit a handover request acknowledge message to the first base station, wherein
    the handover request acknowledge message includes holding information indicating that the WLAN termination device holds a context of the user equipment.

* * * * *